Figure 1:
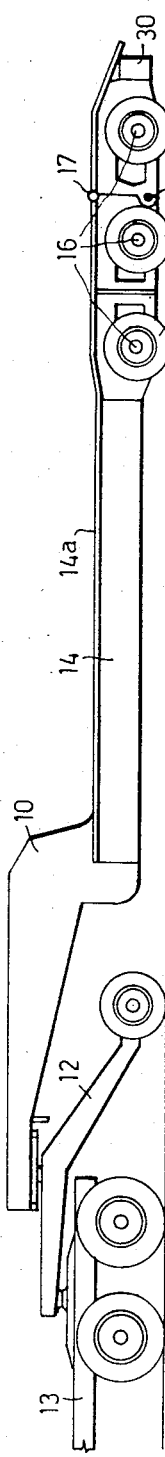

United States Patent
Drake

[15] 3,698,734
[45] Oct. 17, 1972

[54] TRAILERS

[72] Inventor: Colin Anthony Drake, Andrew Street, Rocklea, Brisbane, Australia

[22] Filed: Feb. 22, 1971

[21] Appl. No.: 117,641

[52] U.S. Cl. .................................................. 280/34 R
[51] Int. Cl. ................................................ B62b 11/00
[58] Field of Search ..................... 280/34 R; 296/27

[56] References Cited

UNITED STATES PATENTS

| | | | |
|---|---|---|---|
| 2,634,663 | 4/1953 | Curtis | 280/34 R |
| 2,681,231 | 6/1954 | Kondracki | 280/34 R |

*Primary Examiner*—Benjamin Hersh
*Assistant Examiner*—Robert R. Song
*Attorney*—Oberlin, Maky, Donnelly & Renner

[57] ABSTRACT

A trailer, particularly a semi-trailer for carrying heavy and wide loads, has a central longitudinal spine attachable to a towing vehicle, and two wheel-mounted side members, connected to either side of the spine by parallel-motion links and thus movable towards or from the spine, in parallelism, to narrow or widen the trailer. At the rear the side members are connected by a telescopic bumper bar with two slidably interfitted parts. The side members are held in laterally adjusted position relative to the spine by locking means associated with the parallel motion links and with the telescopic bumper bar.

1 Claim, 5 Drawing Figures

PATENTED OCT 17 1972 3,698,734

TRAILERS

This invention relates to improvements in trailers, particularly heavy-duty semi-trailers.

The transporting of very heavy and wide loads on heavy-duty trailers is usually subject to many restrictions to avoid undue inconvenience and danger to other road users. As the trailers themselves require to be wide to carry such loads safely, their travel may be greatly restricted whether travelling loaded or returning unloaded.

It is the general object of this invention to provide a trailer of which the width may be adjusted easily and quickly, and thus reduced when the trailer is to travel unloaded or with a reduced load. Another object is to provide such a trailer which will be shortened when its width is reduced.

Broadly, the invention resides in a trailer having a frame including a longitudinal central spine, a wheel-mounted side member to each side of the spine, parallel-motion links connecting the spine to each of the side members so that both side members may be moved in parallelism towards or away from the spine, and locking means for releasably locking the side members in laterally adjusted positions relative to the spine.

Figure 2:
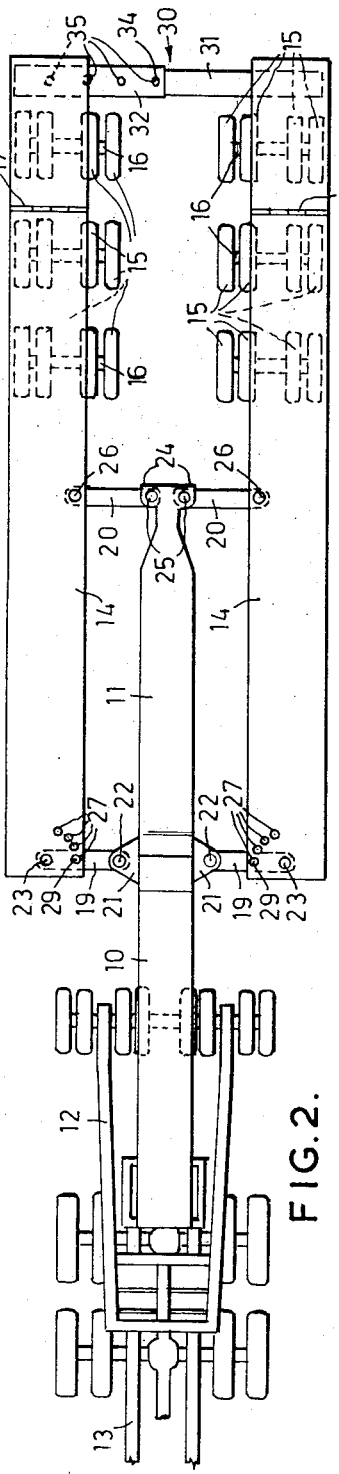
Figure 3:
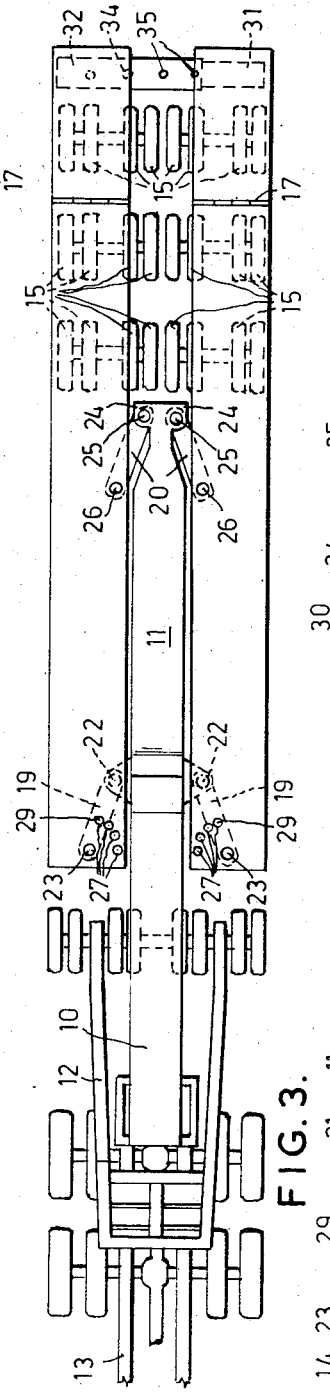
Figures 4, 5:

In the drawings:

FIG. 1 is a side elevation of a semi-trailer according to the invention, coupled to a dolly which in turn is coupled to a prime mover of which part only is shown, FIGS. 2 and 3 are plan views of the parts shown in FIG. 1, the semi-trailer being shown extended to maximum width in FIG. 2, and contracted to minimum width in FIG. 3, FIG. 4 is a detail drawing to enlarged scale showing in partly sectioned front elevation a front parallel-motion link of the semi-trailer, and FIG. 5 is a detail section drawing to enlarged scale of part of the bumper bar of the semi-trailer.

The semi-trailer has a main frame including a conventional goose-neck 10 forming the front of a longitudinal central spine member 11. The semi-trailer is hauled by pivotally coupling the goose-neck to a dolly 12 which in turn is pivotally coupled to a prime mover of which part is indicated at 13.

The main frame of the semi-trailer has two side members or main boxes 14 connected to either side of and parallel to the spine member 11. The main boxes 14 extend rearwardly of the spine 11, each being mounted at its rear on wheels 15 on three axles 16 passing through the main box, the deck 14a of the main box being extended laterally to cover the outermost wheels 15. The rear part of each main box 14 is hinged transversely at 17 so that this rear part, carrying the rearmost axle 16 may, on the release of a locking pin 18, be hingedly swung up, forwards and down to shorten the semi-trailer when being hauled unloaded or with a small return load.

The main boxes 14 are connected to the spine 11 by parallel-motion links comprising, for each main box, a front link 19 and a rear link 20. A pair of front link brackets 21 are secured to both sides of the spine 11 at the base of the goose-neck 10, and in each of these brackets the inner end of one of the front links 19 is pivoted about a vertical axis pin 22. The outer end of each front link 19 is pivoted about a vertical axis pin 23 to the front part of a main box 14. Each of the rear links 20 has its inner end pivoted in one of a pair of pivot brackets 24 at the rear of the spine 11 by a vertical axis pin 25, its outer end being pivoted about a vertical axis pin 26 to the appropriate main box 14. Each front link 19 is parallel to and of the same length as the corresponding rear link 20.

A series of holes 27 are formed in each main box 14 equidistant from the outer axis pin 23 of the front link 19 of that main box; and within the front link is a pneumatic ram 28 of which the plunger 29 is normally extended by a spring within the ram to engage in a selected one of the holes 27 to retain the main box 14 in desired laterally adjusted position.

The two main boxes 14 are interconnected at the rear by a telescopic bumper bar 30 consisting of an inner box-section member 31 rigidly secured at one end to the rear of one main box 14, and slidable in an outer box-section member 32 rigidly secured at one end to the rear of the other main box 14. Rollers or other anti-friction means (not shown) may be provided for reducing the friction in telescopic adjustment of the bumper bar. Within the inner member 31 of the bumper bar are two laterally displaced and oppositely arranged pneumatic rams 33 of which the plungers 34 are normally extended by springs within the rams to engage with selected ones of series of holes 35 in the top and in the bottom of the outer box-section member 32. The rams 33 are in the same pneumatic circuit as the two rams 28 of the front parallel motion links 19, so that all may be simultaneously operated to disengage their locking plungers, or to permit the plungers to be brought into operative position by their springs.

When the semi-trailer is to carry a wide load, it is brought to maximum width, as shown in FIGS. 1 and 2. When required, it may be brought to such lesser width as is appropriate to its load by simultaneously bringing the locking plungers 29 of the front links 19 and 34 of the bumper bar 30 to retracted or inoperative positions. With the independent braking system of the wheel 15 applied, the prime mover 13 is slowly driven rearwardly for a short distance so that the spine member 11 is moved rearwards relative to the main boxes 14, which by the action of the parallel motion links are forced towards each other the wheels 15 being moved laterally over the ground. When the semi-trailer has thus been brought to desired reduced width, or to minimum width as shown in FIG. 3, the locking plungers 29 and 34 are permitted to return to operative position, locking the front links 19 and the telescopic bumper bar 30. It will be appreciated that as the main boxes 14 are brought towards the spine 11, the length of the semi-trailer is shortened. By swinging the rearmost hinged sections of the main boxes up, forward and down, as before described, the semi-trailer may be further shortened.

To increase the width of the semi-trailer, the locking plungers 29 and 34 are retracted, brakes of the wheels 15 are applied and the prime mover 13 is slowly advanced until the main boxes 14 are sufficiently separated, whereupon the plungers 29 and 34 are again engaged.

What I claim is:

1. A trailer having a frame including a longitudinal central spine, a wheel-mounted side member to each side of the spine, parallel-motion links connecting the spine to each of the side members in such manner that both of the side members may be moved in parallelism towards or from the spine, a telescopic bumper bar consisting of two slidably interfitted parts, one secured to the rear of one side member, the other secured to the rear of the other side member, link locking means adapted releasably to lock a parallel motion link connecting each side member to the spine in any selected one of a number of angular relationships to the side member, said link locking means comprising a plunger within the link, and spring-loading means adapted to extend the plunger into engagement with any selected one of a series of holes in the side member to which the link is connected, bumper locking means adapted releasably to lock the bumper bar in any selected one of a number of telescopically adjusted positions, said bumper locking means comprising a pair of laterally displaced plungers within the inner telescopic member, and spring-loading means adapted to extend the plungers into engagement with any selected ones of series of holes in the outer telescopic member, and pneumatic means for simultaneously retracting the plungers of said links and said bumper bar.

* * * * *